(12) United States Patent
Domeisen et al.

(10) Patent No.: US 10,997,834 B2
(45) Date of Patent: May 4, 2021

(54) ASSESSING THE SECURITY SITUATION BY MEANS OF IOT ACTIVITY SENSORS

(71) Applicant: Siemens Schweiz AG, Zürich (CH)

(72) Inventors: Patrik Domeisen, Knonau (CH); Hilmar Konrad, Baar (CH)

(73) Assignee: SIEMENS SCHWEIZ AG, Zurich (CH)

( * ) Notice: Subject to any disclaimer, the term of this patent is extended or adjusted under 35 U.S.C. 154(b) by 115 days.

(21) Appl. No.: 16/391,787

(22) Filed: Apr. 23, 2019

(65) Prior Publication Data

US 2019/0333350 A1    Oct. 31, 2019

(30) Foreign Application Priority Data

Apr. 27, 2018    (DE) .................. 10 2018 206 608.6

(51) Int. Cl.
| | |
|---|---|
| *G08B 13/196* | (2006.01) |
| *G06N 3/08* | (2006.01) |
| *G08B 13/20* | (2006.01) |
| *G08B 21/18* | (2006.01) |
| *G08B 26/00* | (2006.01) |

(52) U.S. Cl.
CPC ............. *G08B 13/196* (2013.01); *G06N 3/08* (2013.01); *G08B 13/20* (2013.01); *G08B 21/18* (2013.01); *G08B 26/007* (2013.01)

(58) Field of Classification Search
CPC .................................................. G08B 13/196
USPC ....................................................... 348/152
See application file for complete search history.

(56) References Cited

U.S. PATENT DOCUMENTS

| | | | |
|---|---|---|---|
| 4,869,624 A | 9/1989 | Viellet | ........................ 407/104 |
| 2014/0375454 A1 | 12/2014 | Konrad et al. | ................ 340/552 |
| 2015/0063640 A1* | 3/2015 | Anabuki | .................. G06T 7/20 |
| | | | 382/103 |
| 2015/0154850 A1 | 6/2015 | Fadell et al. | ................... 340/501 |
| 2017/0105091 A1 | 4/2017 | Gonnet et al. | ............. 455/456.1 |
| 2018/0005125 A1 | 1/2018 | Fadell et al. | |
| 2019/0215183 A1* | 7/2019 | Krasadakis | ........ G06Q 10/1095 |
| 2019/0332871 A1* | 10/2019 | Sudarsan | ......... G08B 13/19686 |

FOREIGN PATENT DOCUMENTS

| | | | |
|---|---|---|---|
| EP | 0 275 793 B1 | 7/1991 | ............. B23B 27/16 |
| EP | 2 751 794 B1 | 8/2017 | ........... G08B 13/196 |
| WO | 2013/045180 A1 | 4/2013 | ............. G08B 13/24 |
| WO | 2018/051349 A1 | 3/2018 | ................ B25J 9/00 |

* cited by examiner

*Primary Examiner* — Yulin Sun
(74) *Attorney, Agent, or Firm* — Slayden Grubert Beard PLLC

(57) ABSTRACT

A method and/or system for assessing the security situation in a building through an evaluation of sensor values provided by activity sensors situated in the building, in particular, in the accommodation region, an estimate of the number of persons actually present in the building, determining the number of persons to be expected in the building by an evaluation of administrative data (HR, Outlook, events, occupancies, etc.). Based upon a comparison of the number of persons to be expected with the number of actual persons, an indicator is determined for assessing the actual security situation in the building or in the accommodation region.

10 Claims, 2 Drawing Sheets

ASSESSING THE SECURITY SITUATION BY MEANS OF IOT ACTIVITY SENSORS

CROSS-REFERENCE TO RELATED APPLICATIONS

This application claims priority to DE Application No. 10 2018 206 608.6 filed Apr. 27, 2018, the contents of which are hereby incorporated by reference in their entirety.

TECHNICAL FIELD

The present disclosure relates to security systems. Various embodiments may include methods, systems, and/or Cloud Service Applications for assessing the security situation in a building, in particular, in an accommodation region of a building.

BACKGROUND

"Security situation" is used to mean whether unauthorized persons (theft) or authorized persons at an unusual time are present in a building. The European patient specifications EP 275793B1 and EP 2751794B1 disclose methods and systems for assessing the security situation in a building, the building having accommodation regions with access authorization for authorized persons, each of whom carries with them an identification label (badge) readable by means of radio (RFID). A notification is emitted if the number of persons physically present in the accommodation regions deviates from the number of identification labels detected by means of RFID. The physical detection takes place either by means of a spatially resolving floor sensitive to pressure and/or proximity, by means of a radio tomographic location and detection method with the aid of RFID reading devices (WLAN) or by means of IR cameras and RFID reading devices in the form of a point detector. The latter can also be a smoke detector with the IR camera and the RFID reading device. It is disadvantageous that the aforementioned systems and methods require RFID reading devices and additional facilities for the physical detection of the persons. This is complex and expensive.

SUMMARY

The teachings of the present disclosure describe an economical method and an economical system for assessing the security situation in a building with accommodation regions having access authorization. For example, some embodiments include a method for assessing the security situation in a building, in particular, in an accommodation region of a building, wherein through an evaluation of sensor values ($CO_2$, Temp, Motion) which are provided by activity sensors (IoT1-IoT4) situated in the building, in particular, in the accommodation region, an estimate of the number of persons actually present in the building, in particular, in the accommodation region, is determined; wherein the number of persons to be expected in the building, in particular, in the accommodation region, is determined by an evaluation of administrative data in relation to the building, in particular, in relation to the accommodation region; and wherein, based upon a comparison of the number of persons to be expected with the number of the actual persons, an indicator is determined for assessing the actual security situation in the building or in the accommodation region.

In some embodiments, the activity sensors (IoT1-IoT4) are connected by means of data technology via an IP communication interface (IP) to a Cloud Service Application (CSA) in a Cloud infrastructure (Cloud) and wherein the Cloud Service Application (CSA) is configured to determine the estimate of the number of persons actually present in the building or the accommodation region; wherein the Cloud Service Application (CSA) is further configured to determine the number of persons to be expected; and wherein the Cloud Service Application (CSA) is also configured to determine the indicator for assessing the actual security situation in the building or in the accommodation region.

In some embodiments, the estimate of the number of persons actually present in the building, in particular, in the accommodation region is determined by means of methods of artificial intelligence (A.I.), in particular, Deep Learning methods.

In some embodiments, the estimate of the number of persons actually present in the building, in particular, in the accommodation region, is based upon the methods of Supervised Learning.

As another example, some embodiments include a system for assessing the security situation in an accommodation region of a building, the system comprising: activity sensors (IoT1-IoT4) which are mounted in the accommodation region that is to be assessed, wherein the respective activity sensors each provide sensor values via a respective IP interface (IP) ($CO_2$, Temp, Motion) for a server (S); a server (S) which is configured: to receive the sensor values ($CO_2$, Temp, Motion) of the activity sensors (IoT1-IoT4), to store them and, on the basis of the sensor values ($CO_2$, Temp, Motion), to determine an estimate of the number of persons actually present in the accommodation region; to determine the number of persons to be expected in the accommodation region by means of an evaluation of administrative data relating to the accommodation region; and to determine an indicator for assessing the actual security situation in the accommodation region, on the basis of a comparison of the number of the persons to be expected with the number of estimated actual persons.

In some embodiments, the activity sensors (IoT1-IoT4) are IoT devices which are connected via an IP network (IP) to the server (S).

In some embodiments, the server (S) comprises an AI engine (A.I.) in order to determine the estimate of the number of persons actually present in the accommodation region, wherein the AI engine (A.I.) is configured to use methods of Deep Learning, in particular, Supervised Learning.

In some embodiments, the server (S) is realized in a Cloud infrastructure (Cloud).

As another example, some embodiments include a Cloud Service Application (CSA) for assessing the security situation in an accommodation region of a building, wherein the Cloud Service Application (CSA) is configured, through an evaluation of sensor values ($CO_2$, Temp, Motion) which are provided by IoT activity sensors (IoT1-IoT4) situated in the accommodation region, to determine an estimate of the number of persons actually present in the accommodation region; wherein the Cloud Service Application (CSA) is further configured to determine the number of persons to be expected in the accommodation region by an evaluation of administrative data in relation to the accommodation region; and wherein the Cloud Service Application (CSA) is further configured, based upon a comparison of the number of persons to be expected with the number of actual persons, to determine an indicator for assessing the actual security situation in the accommodation region.

In some embodiments, the Cloud Service Application (CSA) is connected by means of data technology via an IP network (IP) to the IoT activity sensors (IoT1-IoT4).

BRIEF DESCRIPTION OF THE DRAWINGS

The teachings and example embodiments of the present disclosure are described in greater detail by reference to the accompanying drawings. In the drawings.

DETAILED DESCRIPTION

Figure 1:
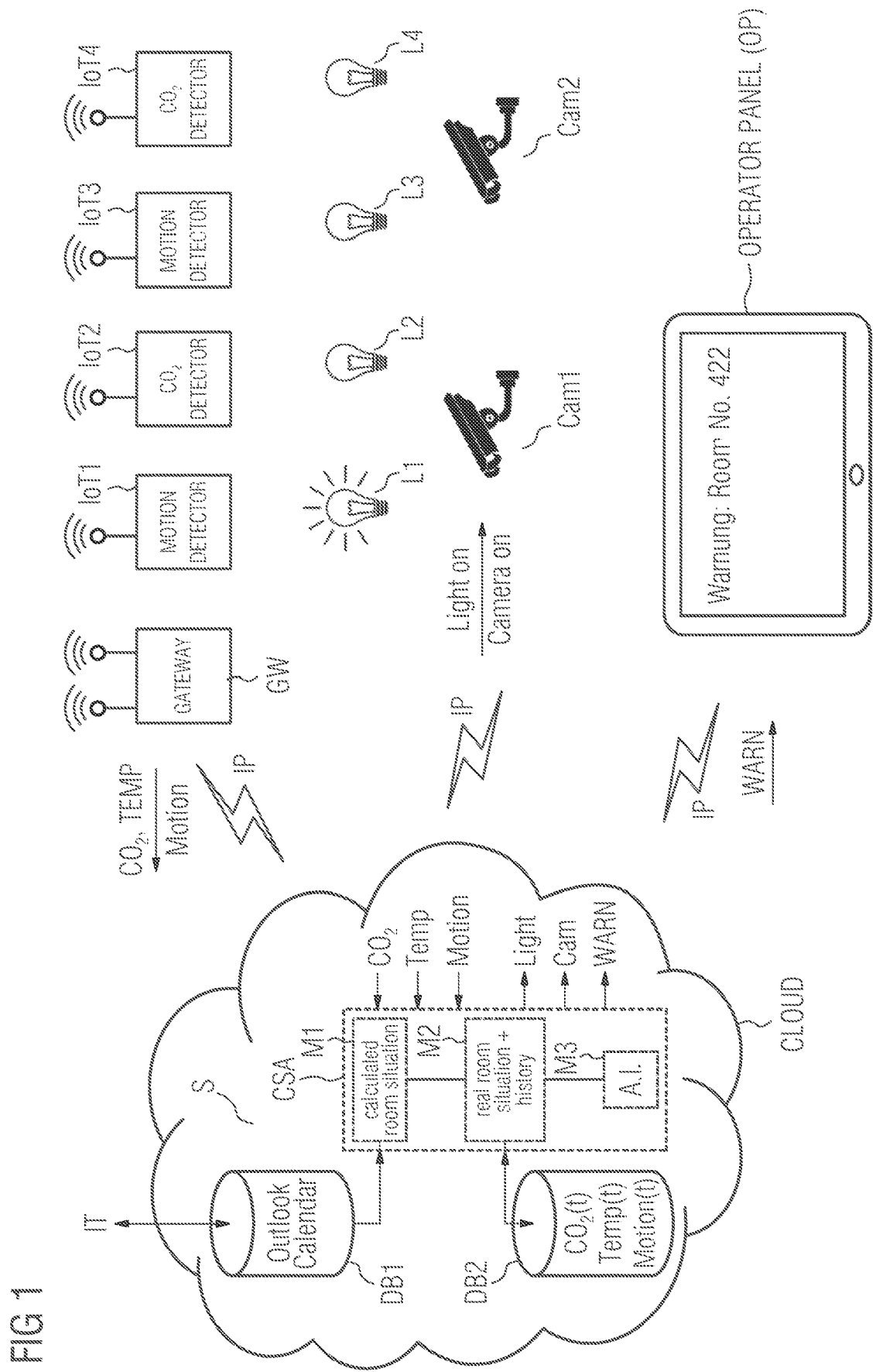
FIG. 1 shows an exemplary system for assessing the security situation in an accommodation region of a building incorporating teachings of the present disclosure.

Various embodiments of the teachings herein may include a method for assessing the security situation in a building, in particular, in an accommodation region of a building, wherein through an evaluation of sensor values which are provided by activity sensors (motion detectors, comfort level sensors) situated in the building, in particular, in the accommodation region (offices, meeting rooms, lobby), an estimate of the number of persons actually present in the building, in particular, the accommodation region, is determined; wherein the number of persons to be expected in the building, in particular, in the accommodation region, is determined by an evaluation of administrative data (HR, Outlook, events, occupancies, etc.) in relation to the building, in particular, in relation to the accommodation region; and wherein, based upon a comparison of the number of persons to be expected with the number of actual persons, an indicator is determined for assessing the actual security situation in the building or in the accommodation region.

The more unauthorized persons that are present in a building (e.g. office building or official building of an authority) or in an accommodation region (e.g. meeting room, lecture theater, etc.) of a building, the worse or more dangerous is the security situation at these locations. The teachings herein employ an infrastructure (e.g. motion detectors or comfort level sensors) which is typically already present in a building. It is not necessary to install, for example, RFID readers for the assessment of the security situation in a building. The number of persons to be expected at a particular time point (e.g. current time point) in an accommodation region ("calculated room situation") can very easily take place via an evaluation of administrative data (e.g. the number of registrations in an electronic calendar system (e.g. Outlook, Gmail, eM Client, Thunderbird)).

Thus, for example, it can be stored in the electronic calendar system how many persons have accepted for a planned meeting in a particular space or at a particular event and are thus to be expected. From the number of accepting persons, the $CO_2$ concentration to be expected can be determined by calculation. In particular, the $CO_2$ concentration to be expected is determinable more exactly from the room volume stored in the electronic calendar system or via the electronic calendar system, e.g. a room volume referenceable in a BIM database. The $CO_2$ concentration is determinable by calculation particularly exactly from the room volume and from an air exchange rate provided for the particular room by a ventilation system. The air exchange rate can, for example, also be stored in the electronic calendar system or be referenceable via the electronic calendar system, e.g. in a BIM database. The aforementioned computational determinations can be carried out, for example, by means of a computer configured therefor.

The real or actual number of persons in the respective accommodation region ("real room situation") is obtained via the evaluation of activity values (motion detections, $CO_2$ concentration, temperature) from corresponding sensors, in particular, comfort level sensors. The evaluation and the comparison of the "calculated room situation" and the "real room situation" takes place advantageously via a correspondingly configured computer. In the event of acknowledged deviations, in particular, deviations of greater than 10 percent, a warning message is issued (e.g. at a control center of the building or to relevant security personnel).

In some embodiments, with the increasing IoT functionality (Internet of Things, the networking of infrastructure present in the building) of motion detectors and comfort level sensors in the context of the building automation, it is also possible to ascertain unusual human activity in the building areas, which can be an indication of a compromised security situation, such as for example, the discovery of a break-in, a theft or espionage activity.

In some embodiments, the activity sensors are connected by means of data technology via an IP communication interface to a Cloud Service Application in a Cloud infrastructure, wherein the Cloud Service Application is configured to determine the estimate of the number of persons actually present in the building or the accommodation region; wherein the Cloud Service Application is further configured to determine the number of persons to be expected; and wherein the Cloud Service Application is also configured to determine the indicator for assessing the actual security situation in the building or in the accommodation region. The Cloud Service Application can be available, for example, as Software-as-a-Service (SaaS) or as Platform-as-a-Service (PaaS) and for one or more buildings. The Cloud Service Application can be operated by a particular building owner or building operator or provided by a third party service provider.

In some embodiments, the Cloud Service Application comprises correspondingly configured hardware (servers, databases, communication means) and software (evaluation and analysis programs; e.g. neural networks, artificial intelligence, Deep Learning programs). In some embodiments, the comfort level sensors and/or the motion detectors are IoT-capable, i.e. as IoT devices (devices belonging to the Internet of Things), internet-capable and connected via corresponding IP networks or IP protocols (e.g. IPv4, IPv6) to the Cloud Service Application for a data exchange. Through the realization of the Cloud Service Application in a Cloud infrastructure, its service (execution of an assessment with regard to the security situation in accommodation regions) can be used by many participants and the more participants use the Cloud Service Application, the better the underlying neural network is trained for assessing the security situation.

In some embodiments, the estimate of the number of persons actually situated in the building, in particular, in the accommodation region is determined by means of methods of artificial intelligence (neural networks with learning and training phases), in particular, Deep Learning methods. By this means, in particular, the use of self-adaptive algorithms is possible, the estimate of the security situation by which becomes ever better over the course of their use and/or over time.

In some embodiments, the estimate of the number of persons actually in the building, in particular, in the accommodation region is based upon the methods of Supervised Learning. With methods of artificial intelligence and/or with machine learning, "supervised learning" rapidly leads to unerring and reliable assertions, since an assertion can be monitored with the aid of another process. The learning process is therefore quicker and the result (i.e. the assertions) is/are more accurate. Thus, with the present problem of "establishing the actual number of actual persons in a space", based on the measured values (temperature, $CO_2$ emissions by persons, etc.) from comfort level sensors with supervised learning methods, it is possible to arrive more quickly at good results, since these results can easily be monitored through other methods (e.g. with simple counting or with RFID readers according to the prior art).

In some embodiments, a system for assessing the security situation in an accommodation region of a building comprises:
  activity sensors (motion detectors, comfort level sensors) which are mounted in the accommodation region that is to be assessed, wherein the respective activity sensors each provide sensor values for a server via an IP interface.
  a server which is further configured:
    to receive the sensor values of the activity sensors, to store them and, on the basis of the sensor values, to determine an estimate of the number of persons actually present in the accommodation region;
    to determine the number of persons to be expected in the accommodation region by means of an evaluation of administrative data (HR, Outlook, events, occupancies, etc.) in relation to the accommodation region; and
    to determine an indicator for assessing the actual security situation in the accommodation region, on the basis of a comparison of the number of the persons to be expected with the number of estimated actual persons. The infrastructure for a system for assessing the security situation is already present in a modern building or can easily be retrofitted.

In some embodiments, the activity sensors are IoT devices which are connected via an IP network to the server. In some embodiments, the server is a correspondingly configured computer (PC, workstation, etc.) with corresponding hardware (processor, memory store, input/output means, communication means) and software components (e.g. relational database, AI programs (decision tables, programs for machine learning, neural networks). The activity sensors are configured as IoT (Internet of Things) devices, i.e. they are Internet-capable (i.e. connected to the Internet, e.g. via WLAN in the building). The IoT devices are connected via an IP network (based on the Internet protocol, e.g. IPv4, IPv6) to the server.

In some embodiments, the server comprises an AI engine in order to determine the estimate of the number of persons actually present in the accommodation region, wherein the AI engine is configured to use methods of Deep Learning, in particular, Supervised Learning. The training and/or the teaching of the neural network forming the basis for machine learning can take place very efficiently with methods of Deep Learning, in particular, Supervised Learning, since the estimate of the number of persons in the accommodation region can be very easily compared and/or adjusted using other methods (e.g. simple counting (by means of a turnstile) or camera monitoring).

In some embodiments, the server is realized in a Cloud infrastructure. The Cloud (computer cloud) can be a "private cloud" or a "public cloud". An advantage of the use of a cloud infrastructure is, inter alia, that the necessary computer performance or storage performance can be adapted by scaling in the server and/or expanded.

In some embodiments, there is a Cloud Service Application for assessing the security situation in an accommodation region of a building, the Cloud Service Application being configured, through an evaluation of sensor values which are provided by IoT activity sensors (motion detectors, comfort level sensors) situated in the accommodation region (offices, meeting rooms, lobby), to determine an estimate of the number of persons actually present in the accommodation region; the Cloud Service Application being further configured to determine the number of persons to be expected in the accommodation region by an evaluation of administrative data (HR, Outlook, events, occupancies, etc.) in relation to the accommodation region; and wherein the Cloud Service Application is further configured, based upon a comparison of the number of persons to be expected with the number of actual persons, to determine an indicator for assessing the actual security situation in the accommodation region. A Cloud Service Application can be provided for users by a supplier or a Service Provider, e.g. as Software-as-a-Service (SaaS) or as a Platform-as-a-Service (PaaS). Users can register themselves and their IoT devices with the Cloud Service Application and possibly download a corresponding app (software program for a mobile device which supports the communication with the Cloud Service Application). By means of the app, a user can be informed by the Cloud Service Application (e.g. by means of a suitable warning message (text and/or audio output and/or color coding)) if the security situation in an accommodation region worsens. The warning message can be output, for example, on a monitor in a control center of the building, and/or on an operator panel in the building, and/or on a mobile communication terminal device (e.g. a Smartphone) of a user (e.g. person responsible for security, security staff member).

In some embodiments, the Cloud Service Application is connected by means of data technology via an IP network to the IoT activity sensors. In some embodiments, the IoT activity sensors (temperature sensors, $CO_2$ detectors, motion detectors, etc.) are Internet-capable IoT devices which are connected by means of data technology via an IP connection (IP network, IP protocol) to the server in the Cloud.

The security situation is taken to mean primarily the level of risk to businesses, public facilities and persons or groups of persons from unauthorized persons with the possible aim of gaining possession of confidential or secret documents, paperwork or electronic documents and data.

The accommodation regions with access authorization are, in particular, office rooms, research and development departments, connecting areas such as corridors, stairways and elevators, as well as entrances to and exits from the building. In principle, continuous areal monitoring or continuous tracking of the physical detection of the persons and a continuous areal detection of the identification label is not necessary. For example, purely connecting areas, stairways or service rooms without additional entrances and exits can remain omitted. The same applies to accommodation regions which require no access authorization in general, such as foyers, canteens or waiting rooms. Thus, a building can be assembled patchwork-like from accommodation regions with access authorization and accommodation regions without any access authorization required.

FIG. 1 shows an exemplary system for assessing the security situation in an accommodation region of a building. The exemplary system comprises:

- activity sensors IoT1-IoT4 (motion detectors, comfort level sensors, $CO_2$ detectors (i.e. carbon dioxide sensors and notification devices), temperature sensors, etc.) which are mounted in the accommodation region that is to be assessed (e.g. meeting room, lecture theater), the respective activity sensors IoT1-IoT4 each providing sensor values via a respective IP interface IP (e.g. IP protocol) $CO_2$, Temp, Motion, for a server S; and
- a server S which is configured:
  - to receive the sensor values $CO_2$, temperature, motion from the activity sensors IoT1-IoT4, to store them and, on the basis of the sensor values $CO_2$, Temp, Motion, to determine an estimate of the number of persons actually situated in the accommodation region;
  - to determine the number of persons to be expected in the accommodation region through an evaluation of administrative data (HR (data from the personnel department), the Outlook calendar, events, occupancies, etc.) in relation to the accommodation region; and
  - to determine an indicator for assessing the actual security situation in the accommodation region, on the basis of a comparison of the number of the persons to be expected with the number of estimated actual persons.

In some embodiments, the activity sensors IoT1-IoT4 are IoT devices which are connected via an IP network (on the basis of a suitable IP protocol) IP to the server S. The activity sensors IoT1-IoT4 can be connected via an IP network (on the basis of a suitable IP protocol) IP to the respective server S, or via a correspondingly configured gateway GW (e.g. an Internet or Cloud gateway).

In the exemplary system according to FIG. 1, the IoT device IoT1 involves a motion detector (e.g. ultrasonic motion detector or PIR sensor), the IoT device IoT2 involves a $CO_2$ detector and notifier, the IoT device IoT3 also involves a motion detector and the IoT device IoT4 in turn involves a $CO_2$ detector and notifier.

In some embodiments, the server S comprises an AI engine A.I. in order to determine the estimate of the number of persons actually present in the accommodation region, wherein the AI engine A.I. is configured to use methods of Deep Learning, in particular, Supervised Learning. In some embodiments, the server S is realized with a Cloud infrastructure CLOUD, e.g. as Software-as-a-Service (SaaS) or as Platform-as-a-Service (PaaS) by a service provider.

In some embodiments, the server S comprises means M1 (calculated room situation) in order to determine the number of persons to be expected in the accommodation region through an evaluation of administrative data (HR (data from the personnel department), the Outlook calendar, events, occupancies, etc.) in relation to the accommodation region. The means M1 (calculated room situation) can be realized by means of suitable software programs and/or hardware components. The means M1 have access to data of an electronic calendar (Outlook Calendar). The electronic calendar (Outlook Calendar) involves, for example, the electronic calendar of a firm or firms in the relevant building, wherein the electronic calendar comprises entries of the employees of the firm or corresponding firms. Advantageously, the entries of the electronic calendar (Outlook Calendar) are placed into a correspondingly configured database DB1 (e.g. an in-memory database). Advantageously, the electronic calendar (Outlook Calendar) has access to further IT systems (e.g. a corporate directory (staff database) of the corresponding firm).

In some embodiments, the server S comprises means M2, DB2 to receive the sensor values $CO_2$, Temp, Motion of the activity sensors IoT1-IoT4, to store them and, on the basis of the sensor values $CO_2$, Temp, Motion, to determine an estimate of the number of persons actually situated in the accommodation region (real room situation and history). With the means M2, DB2, the server can realize methods of artificial intelligence (AI, KI), e.g. machine learning or training a neural network. For this purpose, the sensor values $CO_2$, Temp, Motion of the activity sensors IoT1-IoT4 are stored with their respective measurement time points $CO_2$(t), Temp(t), Motion (t) in the database DB2. Based upon the collected historical data, for example, with methods of Deep Learning, the estimate of the respective number of the respective number of persons actually present in the accommodation region improves continuously over time.

In some embodiments, the server S is configured to determine an indicator for assessing the actual security situation in the accommodation region on the basis of a comparison of the number of the persons to be expected with the number of estimated actual persons. If the indicator reaches a particular value (e.g. if the number of estimated actual persons exceeds the number of expected persons by over 10 percent), measures can be automatically initiated by the server S. Thus, by means of the IP connection IP, warning messages WARN can be emitted, e.g. to a control center and/or to a mobile communication terminal device (e.g. a smartphone) or to a plurality thereof, and/or to one or a plurality of operator panels (OP, OPERATOR PANEL). Furthermore, corresponding signals, Light, Light On are sent to lights L1-L4 for an optical notification. In the representation according to FIG. 1, it is shown that the lamp L1 is activated. As a further measure, Cam, Camera On, it can be initiated that, for example, a particular camera Cam1, Cam2 is controlled (e.g. panning in a particular direction, zooming).

In some embodiments, the server S realizes a Cloud Service Application CSA for assessing the security situation in an accommodation region of a building, the Cloud Service Application CSA being configured, through an evaluation of sensor values which are provided by IoT activity sensors IoT1-IoT4 (motion detectors, comfort level sensors, etc.) situated in the accommodation region (offices, meeting rooms, lobby), to determine an estimate of the number of persons actually present in the accommodation region; the Cloud Service Application CSA being further configured to determine the number of persons to be expected in the accommodation region by an evaluation of administrative data (HR, Outlook, events, occupancies, etc.) in relation to the accommodation region; and the Cloud Service Application CSA being further configured, based upon a comparison of the number of persons to be expected with the number of actual persons, to determine an indicator for assessing the actual security situation in the accommodation region.

In some embodiments, the Cloud Service Application CSA is connected by means of data technology via an IP network IP to the IoT activity sensors IoT1-IoT4. The IoT activity sensors IoT1-IoT4 are, in particular, motion detectors (PIR sensors) and comfort level sensors which are also present in the building for the purpose of light control and air quality regulation. The comfort level sensor (air quality sensor) detects the $CO_2$ concentration and, where relevant, the temperature and the relative air humidity. The IoT activity sensors IoT1-IoT4 are connected either directly or indirectly by means of data technology via an IP communication interface IP to a Cloud infrastructure CLOUD. The Cloud infrastructure CLOUD advantageously comprises a Cloud Service Application CSA, a database DB2 for continual storage of the motion data and $CO_2$ concentration values acquired via the IoT activity sensors IoT1-IoT4 and $CO_2$ concentration values and also, where relevant, temperature and air humidity values over time and a database DB1 with the occupancy data of building rooms (offices, meeting rooms) with the respectively booked number of persons, e.g. from Outlook.

In some embodiments, the Cloud Service Application CSA compares the detected activity values ($CO_2$ concentration, temperature, air humidity and motion detection in the respective building room ("real room situation") with the expected activity values ("calculated room situation") on the basis of the occupancy data. Thus, a respective $CO_2$ concentration value and an ambient temperature in a room can be extrapolated from the expected number of persons x air consumption and from the expected number of persons x heat output and a known air exchange rate in the room.

In some embodiments, the comparison is performed by an AI engine which evaluates temporally both quantitative deviations of the measured activity values from the calculated activity values after a learning or training phase on the basis of a pattern matching. In the event of too large a deviation, a warning message is then output, for example, to the security personnel. At the same time, in the relevant rooms or close thereto, cameras Cam1, Cam2 can be connected in and/or the light there switched on.

In some embodiments, with the increasing IoT functionality (e.g. Internet capability; i.e. the IoT devices IoT1-IoT4 are equipped so that a connection can be made to the Internet) of motion detectors and comfort level sensors in the context of the building automation, it is also possible to ascertain unusual human activity in building areas, which can be an indication of a compromised security situation, such as, for example, the discovery of a break-in, a theft or espionage activity.

Figure 2:
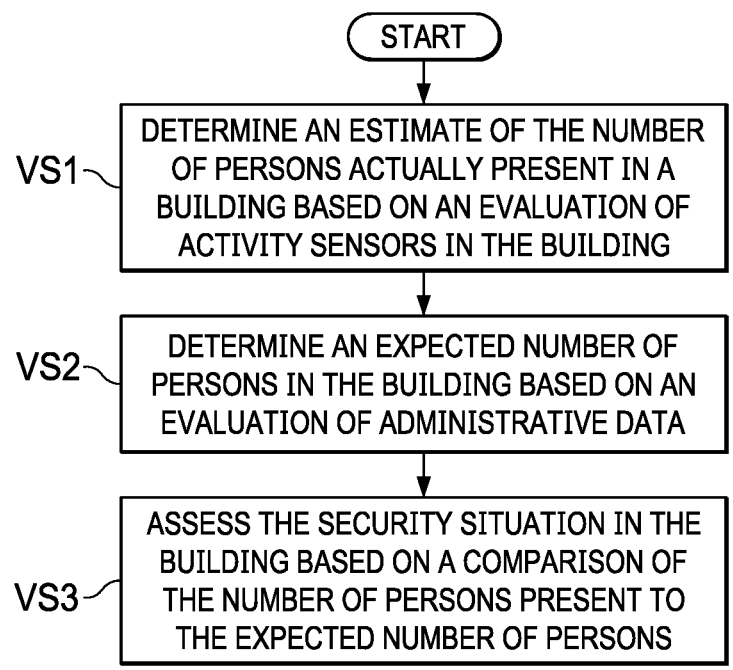
FIG. 2 shows an exemplary flow diagram for a method for assessing the security situation in an accommodation region of a building incorporating teachings of the present disclosure.

FIG. 2 shows an exemplary flow diagram for a method for assessing the security situation in an accommodation region of a building,
- (VS1) wherein through an evaluation of sensor values which are provided by activity sensors (motion detectors, comfort level sensors) situated in the building, in particular, in the accommodation region (offices, meeting rooms, lobby), an estimate of the number of persons actually present in the building, in particular, in the accommodation region, is determined;
- (VS2) wherein the number of persons to be expected in the building, in particular, in the accommodation region, is determined by an evaluation of administrative data (HR, Outlook, events, occupancies, etc.) in relation to the building, in particular, in relation to the accommodation region; and
- (VS3) wherein, based upon a comparison of the number of persons to be expected with the number of actual persons, an indicator is determined for assessing the actual security situation in the building or in the accommodation region.

In some embodiments, the activity sensors are connected by means of data technology via an IP communication interface to a Cloud Service Application in a Cloud infrastructure, wherein the Cloud Service Application is configured to determine the estimate of the number of persons actually present in the building or the accommodation region; wherein the Cloud Service Application is further configured to determine the number of persons to be expected; and wherein the Cloud Service Application is also configured to determine the indicator (e.g. a benchmark) for assessing the actual security situation in the building or in the accommodation region. In some embodiments, the determination of the indicator and the value of the indicator are continuously improved by means of methods of artificial intelligence.

In some embodiments, the estimate of the number of persons actually in the building, in particular, in the accommodation region is determined by means of methods of artificial intelligence (neural networks with learning and training phases), in particular, Deep Learning methods. In some embodiments, the estimate of the number of persons actually in the building, in particular, in the accommodation region, is based upon the methods of Supervised Learning. With the present problem, good results are achieved more rapidly with Supervised Learning with regard to the number of actual persons, based upon the measured values (temperature, $CO_2$ emitted by the persons).

In some embodiments, the method is realized based upon a Cloud infrastructure and on the basis of components (IoT sensors) which are already present in the building. IP networks, e.g. WLAN connections, can easily be installed.

REFERENCE CHARACTERS

CLOUD Cloud infrastructure
CSA Cloud Service Application
S Server
GW Gateway
IoT1-IoT4 IoT device
OP OPERATOR PANEL
L1-L4 Light
Cam1, Cam 2 Camera
IP IP connection
IT IT infrastructure
DB1, DB2 Database
A.I. Artificial intelligence
M1-M3 Module
$CO_2$ Carbon dioxide message
Temp Temperature message
Motion Motion message
Light Message to light system
Cam Message to camera system
WARN Warning message
Outlook calendar Electronic calendar
VS1-VS3 Method step

The invention claimed is:

1. A method for assessing the security situation in a building, the method comprising:
evaluating sensor values provided by activity sensors located in the building to estimate a number of persons actually present in the building;
evaluating a number of persons expected to be present in the building based on expected activity values;
comparing the number of persons to be expected to the number of persons actually present to assess the actual security situation in the building; and
wherein the expected activity values include occupancy data based on an electronic calendar system;
if the actual security situation in the building includes a disparity between the number of persons to be expected and the number of persons actually present exceeding a predefined threshold value, initiating automatic security measures including zooming and/or panning a camera.

2. The method as claimed in claim 1, wherein:
the activity sensors are connected via an IP communication interface to a Cloud Service Application in a Cloud infrastructure;
the Cloud Service Application determines the estimate of the number of persons actually present in the building or the accommodation region;
the Cloud Service Application determines the number of persons to be expected; and
the Cloud Service Application compares the number of persons to be expected to the number of persons actually present.

3. The method as claimed in claim 1, wherein the estimate of the number of persons actually present in the building is determined using artificial intelligence.

4. The method as claimed in claim 3, wherein estimating the number of persons actually present in the building includes using Supervised Learning.

5. A system for assessing the security situation in an accommodation region of a building, the system comprising:
activity sensors mounted in an accommodation region of the building, wherein the activity sensors provide sensor values via a respective IP interface to a server;
the server configured to:
receive and store the sensor values from the activity sensors and determine an estimate of the number of persons actually present in the accommodation region on the basis of the sensor values;
determine an expected number of persons in the accommodation region by evaluating expected activity values associated with the accommodation region;
assess an actual security situation in the accommodation region by comparing the number of the persons to be expected with the number of estimated actual persons; and
if the actual security situation in the building includes a disparity between the number of persons to be expected and the number of persons actually present exceeding a predefined threshold value, initiating automatic security measures including zooming and/or panning a camera
wherein the expected activity values include occupancy data based on an electronic calendar system.

6. The system as claimed in claim 5, wherein the activity sensors comprise IoT devices connected via an IP network to the server.

7. The system as claimed in claim 5, wherein:
the server comprises an AI engine used to determine the estimate of the number of persons actually present in the accommodation region; and
the AI engine employs methods of Deep Learning and/or Supervised Learning.

8. The system as claimed in claim 5, wherein the server comprises a Cloud infrastructure.

9. A Cloud Service Application for assessing a security situation in an accommodation region of a building, wherein the Cloud Service Application is stored on a non-transitory memory and configured, when executed by a processor, causes the processor to:
evaluate sensor values provided by IoT activity sensors situated in the accommodation region;
estimate a number of persons actually present in the accommodation region;
determine a number of persons expected to be in the accommodation region by evaluating expected activity values related to the accommodation region;
to assess the security situation based upon a comparison of the number of persons to be expected with the number of actual persons;
wherein the expected activity values include occupancy data based on an electronic calendar system; and
if the actual security situation in the building includes a disparity between the number of persons to be expected and the number of persons actually present exceeding a predefined threshold value, initiating automatic security measures including zooming and/or panning a camera.

10. The Cloud Service Application as claimed in claim 9, wherein the Cloud Service Application is connected via an IP network to the IoT activity sensors.

* * * * *